United States Patent [19]

Sasagaki

[11] Patent Number: 4,730,201

[45] Date of Patent: Mar. 8, 1988

[54] AUTOMATIC FOCUS ADJUSTMENT APPARATUS

[75] Inventor: Nobuaki Sasagaki, Kawasaki, Japan

[73] Assignee: Nippon Kogaku K. K., Tokyo, Japan

[21] Appl. No.: 72,530

[22] Filed: Jul. 13, 1987

[30] Foreign Application Priority Data

Jul. 16, 1986 [JP] Japan ................................. 61-166989

[51] Int. Cl.⁴ .............................................. G03B 3/00
[52] U.S. Cl. .................................... 354/402; 354/400
[58] Field of Search ............... 354/400, 401, 402, 403, 354/404, 405, 406, 407, 408, 409

[56] References Cited

U.S. PATENT DOCUMENTS 4,314,748  2/1982  Kawabata et al. ................... 354/409
4,557,577  12/1985 Shinoda ............................... 354/400

FOREIGN PATENT DOCUMENTS 60-91310  5/1985  Japan .

Primary Examiner—L. T. Hix
Assistant Examiner—David M. Gray
Attorney, Agent, or Firm—Shapiro and Shapiro

[57] ABSTRACT

An automatic focus adjustment apparatus of this invention is constituted by: position detector for detecting the position of a photographing lens to be driven to the in-focus position in accordance with the state of focus; a memory section for storing therein a given position of the photographing lens which is specified by an operator; a command generator for generating a command for the photographing lens to be shifted to the thus-stored position; a difference calculating circuit for calculating the difference between the thus-stored position and the current focus position of the photographing lens; and a drive controller for controlling a drive motor so that the drive motor may drive the photographing lens to the stored position in response to the command from the command generator and in accordance with the thus-calculated difference. The command generator issues a command in correspondence with a desired focus position of the photographing lens. In response to the command, the drive controller controls the drive motor so that it may drive the photographing lens toward the stored position in accordance with the difference between the stored position and the current position which is calculated by the difference calculating circuit.

20 Claims, 3 Drawing Figures

AUTOMATIC FOCUS ADJUSTMENT APPARATUS

BACKGROUND OF THE INVENTION

1. Field of the Invention

The present invention relates to an automatic focus adjustment apparatus for a photographic camera, and more particularly to an automatic focus adjustment apparatus capable of rapidly driving a photographing lens to a desired focus position.

2. Related Background Art

It has heretofore been known that a photographic camera of the type provided with an automatic focus adjustment apparatus commonly includes a function which is called "focus lock". One typical example of such photographic cameras is arranged such that, when its photographing lens is focused on an object during the operation of a shutter release button in its halfway depressed state, the focusing operation of the photographing lens is locked as long as the shutter release button continues to be halfway depressed. Another typical example is arranged such that its photographing lens is continuously driven toward the in-focus position in accordance with the motion of an object during the operation of a shutter release button in its halfway depressed state, the photographing lens being locked at a desired focus position by a focus-lock operation member which is provided separately from the shutter release button.

The former type of focus lock is arranged to be cancelled by stopping the operation of the shutter release button in its halfway depressed state while the latter type of focus lock is arranged to be cancelled by stopping the operation of the focus-lock operation member.

While the focus position of the aforesaid conventional type of photographic camera is being locked with respect to a first object by the operation of its focus lock, a photographer may try to rapidly take a picture of a second object. In the case of the former type of focus lock, after the photographer has removed his finger from the shutter release button, he must again depress it halfway to bring the second object into focus. In the case of the latter type of focus lock, after the photographer has stopped the operation of the focus lock member, he must focus his camera on the second object. In either case, it is necessary to clear the in-focus position which was previously locked with respect to the first object. Therefore, the photographer must again operate the shutter release button in its halfway depressed state so as to bring the first object into focus and then perform a focus-lock operation. This forces the photographer into an awkward photographic operation.

SUMMARY OF THE INVENTION

It is therefore an object of the present invention to provide an automatic focus adjustment apparatus capable of rapidly driving a photographing lens to a given focus position.

The aforesaid object is achieved by the present invention which provides an automatic focus adjustment apparatus comprising: position detecting means for detecting the position of a photographing lens to be driven to the in-focus position in accordance with the state of focus; memory means for storing therein the position of a photographing lens which is specified as desired; command means for generating a command for the photographing lens to be shifted to the thus-stored position; difference calculating means for calculating the difference between the thus-stored position and the present position of the photographing lens; and drive control means for controlling drive means so as to drive the photographing lens to the stored position in response to the command from the command means in accordance with the thus-calculated difference irrespective of the detected focus state.

A desired position of the photographing lens is stored in the memory means and then the command means is caused to issue a command. In response to the command, the drive control means controls the drive means so that the photographing lens may be driven to the stored position in accordance with the difference between the stored position and the current position which is calculated by the difference calculating means.

DESCRIPTION OF THE PREFERRED EMBODIMENT

Figure 1:
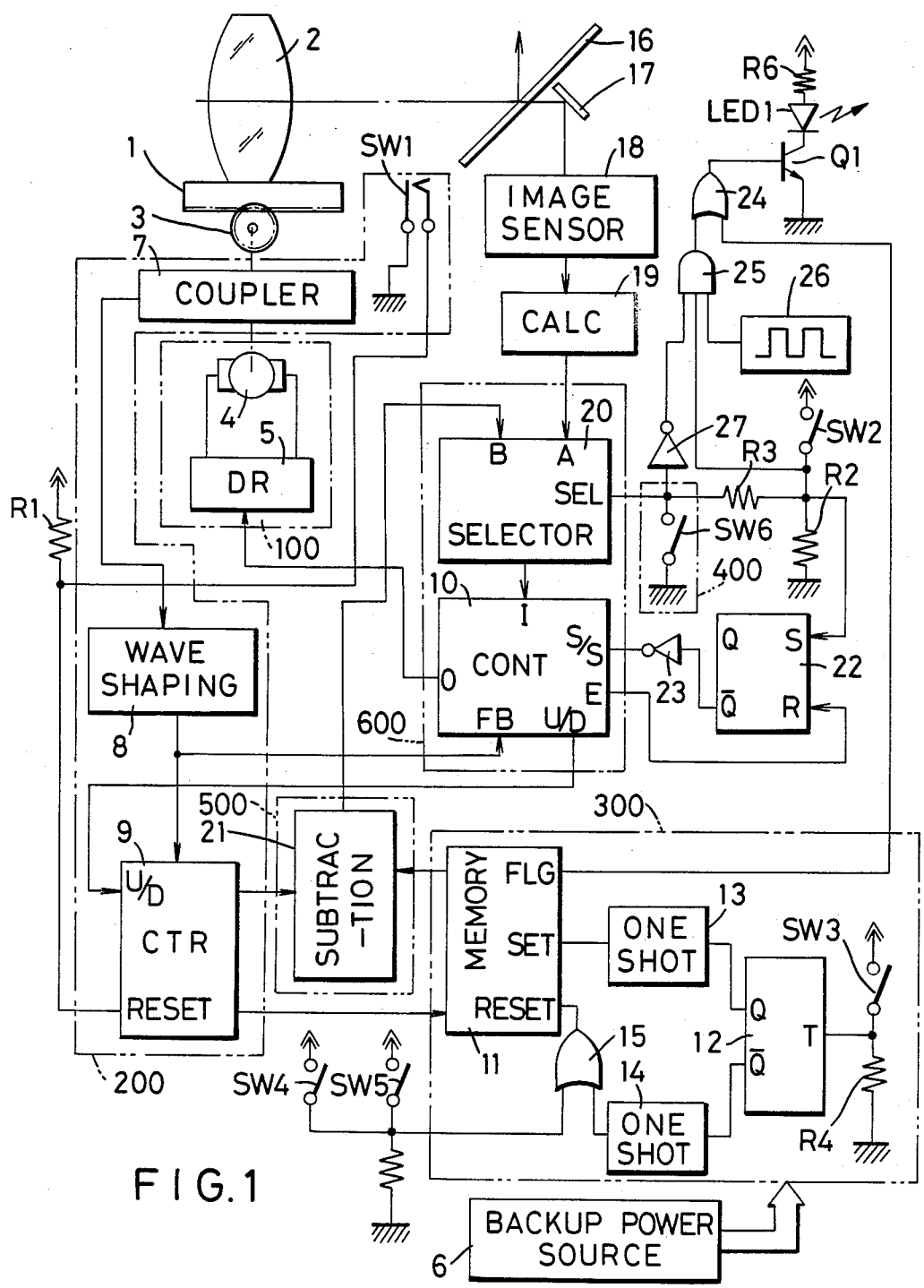
FIG. 1 is a block diagram showing one preferred embodiment of the present invention.

A preferred embodiment of the present invention will be described below with reference to FIGS. 1 and 2.

A photographing lens 2 held by a helicoid 1 is driven in the direction of the optical axis by the torque of a lens drive motor 4 which is transmitted via a gear 3 to the helicoid 1. A photocoupler 7 is constituted by a photo-interruptor and a slit disk which is engaged with the output shaft of the lens drive motor 4 under the control of a motor drive circuit 5. The photocoupler 7 outputs a flashing signal in correspondence with the motion of the motor 4. The thus-output flashing signal is converted into a pulse signal in a wave shaping circuit 8, and then supplied to an up/down counter 9 for detecting the position of the photographing lens 2. The up/down counter 9 is operable for counting up or down incoming pulse signals in accordance with an up signal or a down signal supplied to a U/D terminal of the up/down counter 9 from a lens drive control circuit 10 which will be described later. When the photographing lens 2 is to be moved from infinity to the closest distance setting, an up signal is supplied to the U/D terminal while, when the photographing lens 2 is to be moved from the closest distance setting to infinity, a down signal is supplied to the U/D terminal. With the photographing lens 2 at infinity, a switch SW1 is closed to reset to "0" the contents of the up/down counter 9. Accordingly, the counted value of the up/down counter 9 represents the current position of the photographing lens 2 from the infinity setting.

The counted value of the up/down counter 9 is supplied to both a memory circuit 11 and a subtraction circuit 21.

When a SET terminal of the memory circuit 11 is set to a high level, the memory circuit 11 stores therein the counted value of the up/down counter 9 and forces its FLG terminal to a high level. Also, when a RESET terminal is set to a high level, the contents of the memory circuit 11 are reset to "0" and thus the FLG terminal is set to a low level. In this case, the storage and resetting of counted values are controlled by turning on and off a switch SW3. Once the switch SW3 has been turned on, a Q terminal of the flip-flop 12 is set to a high level and a one-shot multivibrator 13 supplies a high-level one-shot pulse to the SET terminal of the memory circuit 11. When the switch SW3 is again turned on, a $\overline{Q}$ terminal of the flipflop 12 is set to a high level and a one-shot multivibrator 14 supplies a high-level one-shot pulse via an OR gate 15 to the RESET terminal of the memory circuit 11. In this way, the memory circuit 11 is set or reset. A switch SW4 is adapted to be turned on with the photographing lens 2 removed from the body of a camera, and supplies a high-level signal to the RESET terminal via the OR gate 15. A switch SW5 is adapted to interlock with an operating member for selecting automatic focusing or manual focusing of the photographing lens 2. When the manual focusing is selected, the switch SW5 is turned on to supply a high-level signal to the RESET terminal via the OR gate 15. Accordingly, the contents stored in the memory circuit 11 are cleared with the switches SW4 and SW5 turned on.

The value stored in the memory circuit 11 is supplied to a subtraction circuit 21, in which calculations are performed on the difference between the supplied value and the counted value of the up/down counter 9. The result is supplied to a B terminal of a data selector 20 which will be described below.

In the meantime, light rays passing through the photographing lens 2 are partially reflected from a completely or partially semi-transparent quick-return mirror 16 to a pentaprism (not shown) and at the same time are partially transmitted through the quick-return mirror 16. The transmitted light rays are reflected from a submirror 17 to an image sensor 18 constituted by a CCD or the like, the image sensor 18 serving as a focus detecting device. The output from the image sensor 18 is supplied to a calculation circuit 19, in which calculations are performed in a predetermined cycle upon the distance and direction of movement of the photographing lens 2 which is required when the lens 2 is to be focused on an object by a known method. The result of such calculations is supplied to an A terminal of the data selector 20 in the form of a signal representing the amount and direction of rotation of the lens drive motor 4, the data selector 20 being disposed at the following stage of the calculation circuit 19.

When the SEL terminal of the data selector 20 is set to a high level, the data selector 20 allows a signal to pass through its A terminal while when the SEL terminal is set to a low level, the data selector 20 allows a signal to pass through its B terminal. When the switch SW2 is turned on by halfway depressing the same, the SEL terminal is forced to a high level whereas the SEL terminal is forced to a low level by turning on a command switch 6 which is operable for driving the photographing lens 2 to a desired position stored in the memory circuit 11.

The data selected by the data selector 20 is supplied to an I terminal of the lens drive control circuit 10. When an S/S terminal of the lens drive control circuit 10 is set to a high level, the control circuit 10 permits driving of the photographing lens 2. With the S/S terminal at a low level the control circuit 10 inhibits the photographing lens 2 from being driven.

When the S/S terminal is at a high level, the control circuit 10 outputs to the motor drive circuit 5 a motor drive signal corresponding to a signal which represents the direction of rotation of the output shaft of the lens drive motor 4 and is supplied to the I terminal. Simultaneously, if the motor 4 is actuated so that the photographing lens 2 is driven from infinity to the closest distance setting, the control circuit 10 outputs an up signal through its U/D terminal. If the motor 4 is actuated so that the lens 2 is driven in the reverse direction, the control circuit 10 outputs a down signal through its U/D terminal. When the motor 4 is activated in this way, the amount of rotation of the output shaft is supplied in the form of a pulse signal to an FB terminal of the lens drive control circuit 10 via the photocoupler 7 and the wave shaping circuit 8. The lens drive control circuit 10 compares: the number of pulses representative of a required amount of rotation of the motor 4 which pulses are supplied to the I terminal; and the number of pulses supplied to the FB terminal. When these two numbers agree with each other, the control circuit 10 outputs a motor stop signal through its O terminal. At this time, the control circuit 10 outputs through its E terminal a high-level pulse representative of the end of drive of the motor 4.

When the aforesaid switch 2 is turned on by halfway depressing it, an S terminal of the flipflop 22 is forced to a high level with its $\overline{Q}$ terminal forced to a low level. Accordingly, the S/S terminal of the lens drive control circuit 10 is forced to a high level via an inverter 23, thereby permitting drive of the photographing lens 2. When the switch 2 is turned off, the S terminal is forced to a low level but the $\overline{Q}$ terminal remains in the last state it assumed. Thus, the S/S terminal of the lens drive circuit 10 is maintained at a high level. In this state, when the aforesaid high-level pulse representative of the end of drive of the motor 4 is supplied to the R terminal of the flipflop 22 through the E terminal of the lens drive control circuit 10, the $\overline{Q}$ terminal of the flipflop 22 goes to a high level and thus the S/S terminal is forced to a low level so as to inhibit the photographing lens 2 from being driven.

An LED1 is a light-emitting diode for providing an indication, and is turned on and off by the on-off operation of a switching transistor Q1. As shown, the FLG terminal of the memory circuit 11 is connected to the base of the transistor Q1 via the OR gate 24. Thus, when the memory circuit 11 stores therein a certain focus position of the photographing lens 2, the FLG terminal goes to a high level and hence the LED1 is turned on. Also, if the memory circuit 11 does not store therein any focus position, the FLG terminal goes to a low level and hence the LED1 is turned off. At this time, when both the command switch SW6 and the switch SW2 are turned on, the LED1 is successively flashed in accordance with the oscillation frequency of the oscillator 26 which is supplied to an AND gate 25.

A backup power source 6 is disposed so as to normally supply electrical power to memory means 300, and therefore, if a main electric power source (not shown) of the camera is turned off, electric power is supplied to the memory means 300.

The aforedescribed components of the preferred embodiment correspond to the respective constituent elements of the present invention in the following manner:
 (1) a drive means 100: the lens drive motor 4, the motor drive circuit 5;
 (2) a position detecting means 200: the photocoupler 7, the wave shaping circuit 8, the up/down counter 9, the switch SW1;

(3) the memory means 300: the memory circuit 11, the switch SW3, the flipflop 12, the one-shot multivibrators 13, 14, the OR gate 15;
(4) command means 400: the switch SW6;
(5) difference calculating means 500: the subtraction circuit 21; and
(6) drive control means 600: the data selector 20. the lens drive control circuit 10.

The operation of the presently preferred embodiment will be described below with reference to the timing chart shown in FIG. 2 with FIG. 1.

(I) AUTOMATIC FOCUSING OPERATION

When the main electric power source (not shown) is energized and the shutter release button is halfway depressed, the switch SW2 is turned on (point a in FIG. 2), the SEL terminal of the data selector 20 goes to a high level, and thus the lens drive control circuit 10 receives data provided at the A terminal, that is, lens-drive data calculated in the calculation circuit 19 for detecting the focus of the photographing lens 2. In the meantime, since the S and Q terminals of the flipflop 22 are respectively forced to high and low levels, the S/S terminal of the lens drive control circuit 10 goes to a high level. Accordingly, a motor drive signal based on the lens drive data calculated in the calculation circuit 19 is supplied to the motor drive circuit 5, and this actuates the motor 4 to drive the photographing lens 2 toward the in-focus position. While the motor 4 is being driven, pulses corresponding in number to the rotation of the motor 4 are supplied to the FB terminal of the lens drive control circuit 10 via the photocoupler 7 and the wave shaping circuit 8. The lens drive control circuit 10 counts the pulses thus fed back, and compares the counted value with the data provided at the I terminal. On the basis of this comparison, the control circuit 10 operates to progressively shorten the energization time of the motor 4 per unit time as the photographing lens 2 is approaching the in-focus position, and thus stops the photographing lens 2 at the in-focus position. In this state, the E terminal is set to a high level after completion of the aforesaid driving of the lens 2 (point a' in FIG. 2).

When the photographing lens 2 is driven in the foresaid manner, the lens drive control circuit 10 supplies an up signal or an down signal to the U/D terminal of the up/down counter 9 in accordance with the direction in which the photographing lens 2 is driven. Thus, the up/down counter 9 counts up or down in accordance with pulses supplied from the wave shaping circuit 8. Accordingly, the counted value of the up/down counter 9 is data representative of the position of the photographing lens 2 with respect to the infinity position.

(II) GIVEN SETTING OF POSITION OF PHOTOGRAPHING LENS

When the switch SW3 for storing therein the position of the photographing lens 2 is turned on (point b in FIG. 2), the Q terminal of the flipflop 12 goes to a high level and the one-shot multivibrator 13 supplies a one-shot pulse to the SET terminal of the memory circuit 11. In consequence, the memory circuit 11 stores therein the current counted value of the up/down counter 9, that is, the current position of the photographing lens 2. At this time, since the FLG terminal of the memory circuit 11 goes to a high level to turn on the transistor Q1 via the OR gate 24, the LED1 serving as an indicator is turned on. It is to be noted that, when the current position of the lens 2 is stored in the memory circuit 11 in the aforesaid manner, if the command switch SW6 is not turned on, the SEL terminal of the data selector 20 does not go to a low level. Accordingly, the data selector 20 allows the incoming data to pass through its A terminal whereby the photographing lens 2 is driven at any time to the in-focus position in accordance with the lens drive data supplied from the calculation circuit 19.

(III) DRIVE OF PHOTOGRAPHING LENS TO STORED POSITION

If the photographing lens 2 is located at a position which differs from the position stored in the memory circuit 11, when the command switch SW6 is turned on (point c in FIG. 2), the SEL terminal of the data selector 20 goes to a low level and the data selector 20 selects the data supplied from the subtraction circuit 21 to the B terminal of the data selector 20. The subtraction circuit 21 outputs a signal representative of: the number of pulses representative of the difference between the current position of the photographing lens 2, i.e., the counted value of the up/down counter 9 and the position of the same stored in the memory circuit 11; and the direction of drive of the photographing lens 2 represented by the difference. The lens drive control circuit 10, therefore, outputs a drive signal to the motor drive circuit 5 in accordance with such data, and thus the photographing lens 2 is driven to the position stored in the memory circuit 11. As long as the command switch SW6 is turned on, the position of the photographing lens 2 is held at the stored position independently of a distance to an object, that is, irrespective of a signal representing the state of focus which is supplied from the calculation circuit 19. When the command switch SW6 is turned off (point d in FIG. 2), the SEL terminal of the data selector 20 goes to a high level and a normal automatic focus adjustment mode is selected.

(IV) CLEARING OF STORED POSITION OF PHOTOGRAPHING LENS

When the switch SW3 is again turned on (point e in FIG. 2), the Q terminal of the flipflop 12 goes to a high level, and the one-shot multivibrator 14 supplies a one-shot pulse to the RESET terminal of the memory circuit 11 via the OR gate 15. Thus, the contents stored in the memory circuit 11 is cleared to "0" and its FLG terminal is set to a low level, thereby turning off the LED1 for providing an indication.

In this state, when the command switch SW6 is turned on (point f in FIG. 2), the pulse signal from the oscillator 26 is supplied to the base of the transistor Q1 via the AND gate 25, and thus the LED1 is successively flashed to provide an indicating that nothing is stored in the memory circuit 11. In this case, the data selector 20 selects the data supplied to its B terminal and supplies the data to the lens drive control circuit 10. However, since the contents of the memory circuit 11 are reset to "0", the subtraction circuit 21 outputs data representative of the driving of the photographing lens 2 from the closest distance setting to the position corresponding to a "0" pulse, i.e., the infinity setting. Accordingly, the photographing lens 2 is driven to the infinity setting (point f' in FIG. 2). Also, when the command switch SW6 is turned off, one input of the AND gate 25 is set to a low level via the inverter 27, thereby turning off the LED1 for providing an indication (point g in FIG. 2).

(V) END OF PHOTOGRAPHING AND OTHERS

Figure 2:
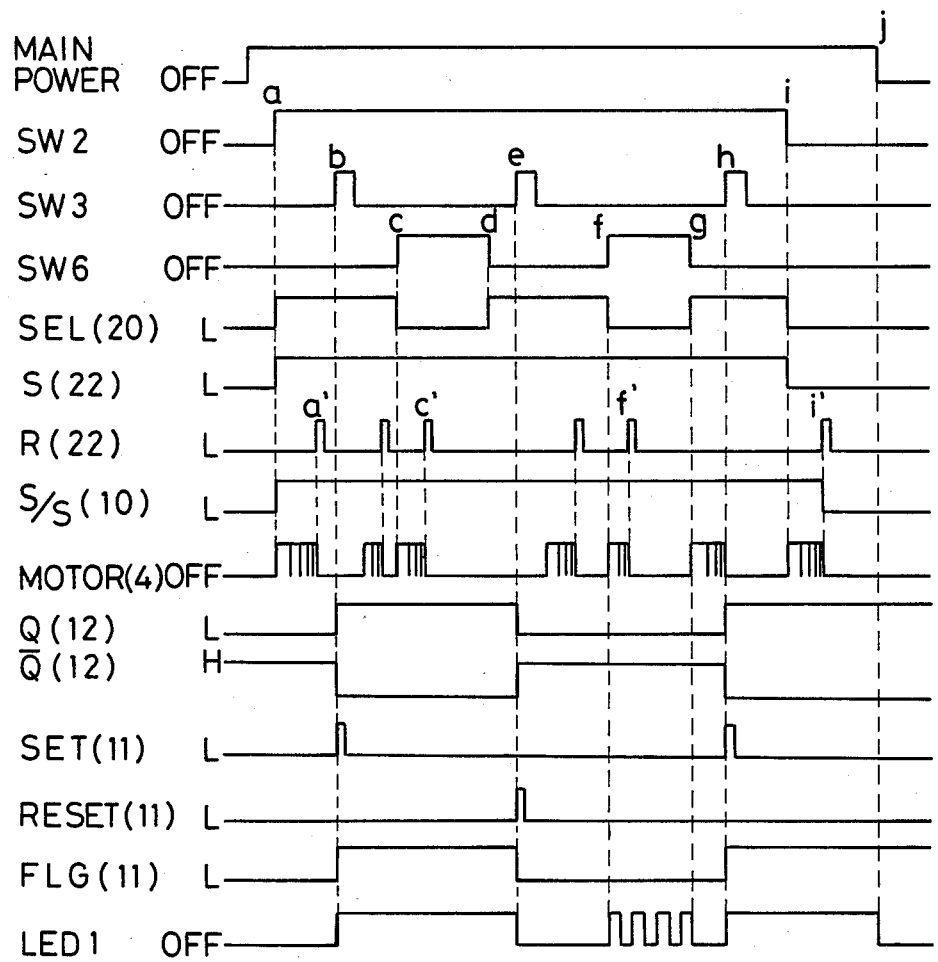
FIG. 2 is a timing chart showing the signals supplied from the respective parts.

As indicated by point h in FIG. 2, after the switch SW3 has been turned on to store a predetermined position of the photographing lens 2 in the memory circuit 11, the shutter release button is released to turn off the switch SW2 (point i of FIG. 2). In consequence, the SEL terminal of the data selector 20 is set to a low level and thus the input at the B terminal, that is, the data from the subtraction circuit 21 is supplied to the lens drive control circuit 10. If the photographing lens 2 is not driven during the period between the points h and i, the data in the subtraction circuit 21 represents zero and thus the photographing lens 2 is not driven. However, if there is any change between the current position of the photographing lens 2 and the stored position of the same, the data representing such change is supplied from the subtraction circuit 21 to the B terminal of the data selector 20 and thus the photographing lens 2 is driven to the stored position. It is to be noted that, although the S terminal of the flipflop 22 is set to a low level by turning off the switch SW2, the $\overline{Q}$ terminal of the flipflop 22 is maintained in the last state it assumed. Accordingly, the S/S terminal of the lens drive control circuit 10 maintains its high level, thereby allowing the photographing lens 2 to be driven in the aforesaid manner.

As described above, when the photographing lens 2 is driven to the stored position, the lens drive control circuit 10 outputs a lens drive end signal through its E terminal (point f' in FIG. 2). When the R terminal of the flipflop 22 receives the output, the output at its $\overline{Q}$ terminal is inverted to a high level. Accordingly, the S/S terminal of the lens drive control circuit 10 is set to a low level so that the subsequent driving of the photographing lens 2 is inhibited.

If no data is stored in the memory circuit 11 when the switch SW2 is turned off (point j in FIG. 2), the subtraction circuit 21 outputs data representative of the driving of the photographing lens 2 from its current position to the infinity setting. When the switch SW2 is turned off, the photographing lens 2 is driven to the infinity setting and stops there.

It is to be noted that the switch SW2 may be interlocked with an external operation button which is disposed separately from the shutter release button.

When the photographing lens 2 is removed from the camera body, the switch SW4 is turned on while, when the manual focusing operation is selected, the switch SW5 is turned on. Accordingly, a high-level signal is supplied to the RESET terminal of the memory circuit 11, thereby clearing the contents stored therein. It is to be noted that, even if a main electric power source switch (not shown) is turned off, the backup power source 6 supplies electric power to the memory circuit 11, the flipflop 12 and the OR gate 15 so as to hold the contents of the memory circuit 11. Also, the switches SW4 and SW5 are connected to the backup power source 6. Accordingly, while the main power source (not shown) is off, the contents stored in the memory circuit 11 are reset by turning off the switches SW4 and SW5.

(Improved Modification)

Figure 3:
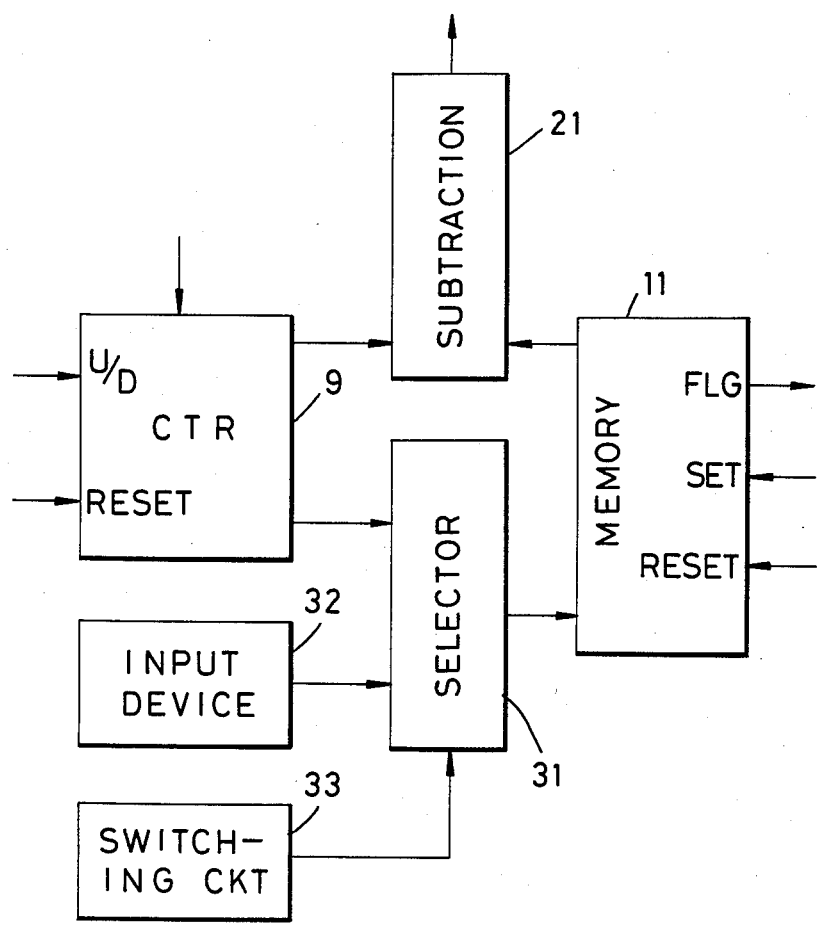
FIG. 3 is a block diagram showing the essential portion of one improved modification of the invention.

As shown in FIG. 3, data output from the up/down counter 9 is entered into the memory circuit 11 via a data selector 31 and an input device 32 inputs to the data selector 31 position information relative to the photographing lens 2. The data selector 31 outputs these two inputs in a switched manner in response to the output from the switching circuit 33. This arrangement makes it easy to input a given focus position of the photographing lens 2 to the memory circuit 11 without the need to repeatedly refocus the photographing lens 2 on an object at a distance which should be stored in the memory circuit 11.

The aforesaid preferred embodiment is arranged such that the distance traveled by the photographing lens 2 from the infinity setting is detected via the photocoupler 7. However, digital codes may be patterned on a surface of the helicoid 1 for carrying the photographing lens 2 so as to output the distance traveled by the photographing lens 2 in the form of digital codes.

A plurality of memory circuits 11 may be disposed so as to store therein a plurality of positions of the photographing lens 2. In order to read out the plurality of positions stored in the memory circuits 11, one or more select switches may be disposed for selecting a desired one among the stored positions, or it is also suitable to read out the stored positions in the order of priority.

In accordance with the present invention, a given position of the photographing lens is stored in the memory circuit, and the photographing lens can be rapidly driven to the stored focus position in response to a predetermined command. Accordingly, if the photographing lens is focused on a first object and the position at this time is stored in the memory circuit, even after a second object has been photographed, the photographing lens can be rapidly refocused onto the first object. Even if there is a large distance between the first and second objects, it is possible to reduce the time required for refocusing, and thus improve the operability of the photographic camera.

In addition, the photographing lens can be set such as to return to the stored position necessarily after completion of shutter release. Thus, improved operability of the photographic camera can be achieved even in a case where an object moves back and forth within a specific distance range. Moreover, the photographing lens may be set such as to return to the infinity setting necessarily after completion of shutter release by resetting the stored position. When the camera is to be stored in a case or the like, it is possible to conveniently reduce the length of projection of the photographing lens. The stored contents are reset when the photographing lens is changed. It is thus possible to prevent the occurrence of errors in photographing by resettting stored data each time the focus position from infinity varies when each lens is interchanged with a different one.

What is claimed is:

1. A photographic camera having drive means for driving its photographing lens in response to a signal supplied from focus detecting means, the barrel of said photographing lens being detachably mounted on the body of said photographic camera, comprising:
   memory means;
   means for storing in said memory means data corresponding to a given position of said photographing lens;
   control means for controlling said drive means in accordance with said data stored in said memory means irrespective of said focus detecting means;
   detect means for outputting a detection signal by detecting the fact that said barrel of said photographing lens is removed from said body of said photographic camera; and reset means for resetting the contents of said memory means in response to said detection signal.

2. A photographic camera according to claim 1 further including means for providing an indication that said reset means resets the contents of said memory means.

3. A photographic camera according to claim 1 further including means for outputting a store signal which causes said store means to store said data in said memory means and indicating means for giving warning in response to said store signal when said reset means resets the contents of said memory means.

4. A photographic camera having drive means for driving its photographing lens in response to a focus detection signal from focus detecting means, comprising:
   memory means;
   means for storing in said memory means data corresponding to a given position of said photographing lens;
   control means for controlling said drive means in accordance with said data stored in said memory means irrespective of said focus detecting means;
   inhibit means for inhibiting the operation of said drive means; and
   reset means for resetting the contents of said memory means in response to said inhibit means.

5. A photographic camera according to claim 4 further including means for providing an indication that said reset means resets the contents of said memory means.

6. A photographic camera according to claim 4 further including means for outputting a store signal which causes said store means to store said data in said memory means and means for giving warning in response to said store signal when said reset means resets the contents of said memory means.

7. A photographic camera according to claim 4, wherein said inhibit means includes an operating member which is operable for enabling manual focusing of said photographing lens, said reset means includes means for outputting a detection signal by detecting the fact that said operating member is operated and means for resetting the contents of said memory means in response to said detection signal.

8. A photographic camera comprising:
   focus detecting means for generating a focus detection signal;
   drive means for driving a photographing lens;
   memory means;
   means for generating a store signal;
   means for storing in said memory means data corresponding to a given position of said photographing lens;
   means for outputting a switching signal;
   control means for controlling said drive means in response to said focus detection signal, said control means controlling said drive means in accordance with said data stored in said memory means in response to said switching signal and irrespective of said focus detection signal;
   reset means for resetting the contents of said memory means;
   indicating means; and
   drive means for driving said indicating means in response to said switching signal immediately after the resetting of said memory means.

9. A photographic camera according to claim 8, wherein said drive means intermittently drives said indicating means in response to said store signal.

10. A photographic camera having drive means for driving its photographing lens in response to a focus detection signal from focus detecting means, comprising:
    focus detecting means for generating a focus detection signal;
    drive means for driving a photographing lens;
    memory means;
    means for generating a store signal;
    means for storing in said memory means data corresponding to a given position of said photographing lens;
    means for outputting a switching signal;
    control means for controlling said drive means in response to said focus detection signal, said control means controlling said drive means in accordance with said data stored in said memory means irrespective of said focus detection signal in response to said switching signal; and
    means for giving warning in response to said switching signal when said data is not stored in said memory means.

11. A photographic camera, comprising:
    focus detecting means for generating a focus detection signal;
    drive means for driving a photographing lens;
    position detecting means for detecting the position of said photographing lens to generate a position detection signal;
    memory means;
    means for generating data corresponding to a given position of said photographing lens on the basis of said position detection signal and then storing said data in said memory means;
    generating means for generating a preset position signal corresponding to said data which is stored in said memory means; and
    select means for selecting a desired one of said focus detection signal and said preset position signal to input the thus-selected signal to said drive means, said drive means driving said photographing lens in response to said selected signal.

12. A photographic camera according to claim 11, wherein said generating means calculates the difference between the position corresponding to said position detection signal and the position corresponding to said data and generating said preset position signal on the basis of said difference.

13. A photographic camera having drive means for driving its photographing lens in response to a focus detection signal from focus detecting means, comprising:
    means for sequentially detecting the position of said photographing lens to generate a position signal corresponding to the detected position of said photographing lens;
    memory means;
    means for outputting a store signal;
    means for storing in said memory means data corresponding to said position signal in response to said store signal;
    calculation means for performing the operation of determining the difference between a position corresponding to said data stored in said memory means and a position corresponding to said position signal to output a calculation signal corresponding to said calculated difference; and control means for controlling said drive means, irrespective of said focus detection means, so that said drive means may drive said photographing lens to a specified position in response to said calculated signal.

14. A photographic camera according to claim 13, wherein said control means selects a signal of said focus detection signal and said calculation signal to supply the selected signal to said drive means, said drive means driving said photographing lens in response to said selected signal.

15. An photographic apparatus having drive means for driving its photographing lens in response to a focus detection signal from focus detecting means, comprising:

means for detecting the position of said photographing lens to generate a position signal;

memory means;

store means for storing in said memory means data representative of a given position of said photographing lens;

calculation means for performing the operation of determining the difference between a position represented by said data stored in said memory means and a position represented by said position signal; and control means for controlling said drive means so that said drive means may drive said photographing lens to a specified position in response to said calculated signal.

16. The apparatus according to claim 15 further including output means for outputting a start signal requesting said drive means to start its driving motion corresponding to said difference calculated by said calculation means.

17. The apparatus according to claim 16 further including an operating member operable for starting the driving motion of said drive means corresponding to said focus detection signal, said control means arranged to control said drive means on the basis of the contents of said memory means in response to the cancelling of operation of said operating member irrespective of said start signal.

18. The apparatus according to claim 15, wherein said store means includes output means for outputting a store signal and means for storing said position signal as said data in said memory means in response to said store signal.

19. The apparatus according to claim 18, wherein said output means includes an operating member thereof and means for generating said store signal in response to the operation of said operating member.

20. The apparatus according to claim 15 further including an operating member operable for starting the driving motion of said drive means corresponding to said focus detection signal, said control means arranged to control said drive means on the basis of the contents of said memory means in response to the cancelling of operation of said operating member.

* * * * *